United States Patent [19]
Spruyt et al.

[11] Patent Number: 6,088,386
[45] Date of Patent: Jul. 11, 2000

[54] TRANSMITTER WITH PHASE ROTOR, MODULATOR/DEMODULATOR, COMMUNICATION SYSTEM AND METHOD PERFORMED THEREBY

[75] Inventors: Paul Marie Pierre Spruyt, Heverlee; Peter Paul Frans Reusens, Laarne, both of Belgium

[73] Assignee: Alcatel, Paris, France

[21] Appl. No.: 08/892,923

[22] Filed: Jul. 15, 1997

Related U.S. Application Data

[60] Provisional application No. 60/052,122, Jul. 10, 1997.

[30] Foreign Application Priority Data

Jul. 15, 1996 [EP] European Pat. Off. .............. 96202004

[51] Int. Cl.[7] .............................. H04L 27/26; H04B 3/20
[52] U.S. Cl. ........................................... 375/222; 370/282
[58] Field of Search .................................... 375/219, 220, 375/222, 257, 377; 370/282

[56] References Cited

U.S. PATENT DOCUMENTS

| 5,317,596 | 5/1994 | Ho et al. .................................. 375/232 |
| 5,331,670 | 7/1994 | Sorbara et al. ........................... 375/362 |
| 5,872,810 | 2/1999 | Philips et al. ............................. 375/222 |

FOREIGN PATENT DOCUMENTS

| WO9305598 | 3/1993 | WIPO . |
| WO9517046 | 6/1995 | WIPO . |

OTHER PUBLICATIONS

"Frequency Domain Echo Cancellation for Discrete Multitone Asymmetric Digital Subscriber Line Transceivers" by David C. Jones, from IEEE Transactions on Communications, vol. 43, No. 2/4, Feb. 1995, New York, pp. 1663–1672.

"Echo Cancellation for Asymmetrical Digital Subscriber Lines" by Younce et al. Supercomm/ICC, 1994 pp. 301–306.

"VLSI DMT Implementation for ADSL" by John Cioffi et al, in the ADSL Standard TiE1.4 with reference No. T1E1.4/93–025.

Modification to DMT Synchronization Pattern Insertion: by John Cioffi et al in ADSL Standard, reference No. T1E1.4/93–089.

"Asymmetric Digital Subscriber Line (ADSL) Metallic Interface Specification", published by American National Standards Institute (ANSI) in Apr., 1994.

"A Multicarrier E1–HDSL Transceiver System with Coded Modulation" by Chow, et al. Published in the issue Nr. 3, May/Jun. 1993 issue of the Journal of European Transactions on Telecommunications and Related Tech. pp. 257–266.

"Performance Evaluation of a Multichannel Transceiver Systems for ADSL and VHDSL Services" by Chow et al., published in NR 6, Aug. 1991 issue of Journal of European Transactions on Telecommunications and Related Tech. pp. 909–919.

*Primary Examiner*—Young T. Tse
*Attorney, Agent, or Firm*—Ware, Fressola, Van Der Sluys & Adolphson LLP

[57] ABSTRACT

A modulator/demodulator (MODEM) is equipped with a rotation circuit (TROT) in its transmitting part (TP) and a rotation circuit (RROT) in its receiving part (RP). To compensate for clock speed differences between the clocks of two communicating modems, the receive rotation circuit (RROT) of one of them rotates the phase of received data carriers in proportion to their respective frequencies. Furthermore, to align transmit data symbols with received data symbols, the transmit rotation circuit (TROT) of one of the modems rotates the phase of the transmit data symbols. Thereto, the phase rotation applied to each carrier whereon the transmit data symbols are modulated, is proportional to the frequency of this carrier and to a phase difference measured between a received pilot carrier (PT) and an expected received pilot carrier (PT_E). When the rotation to be applied to a transmit data symbol corresponds to a time shift of half the length of one sample, a sample is duplicated or deleted in a transmit data symbol by transmit skip/stuff circuit (TSS).

10 Claims, 2 Drawing Sheets

US 6,088,386

TRANSMITTER WITH PHASE ROTOR, MODULATOR/DEMODULATOR, COMMUNICATION SYSTEM AND METHOD PERFORMED THEREBY

This application claims the benefit of U.S. Provisional Application No. 60/052,122, filed Jul. 10, 1997.

TECHNICAL FIELD

The present invention relates to a transmitter having an input that receives digital data and which generates an analogue transmit signal therefrom, a modulator/demodulator a communication system wherein such a modulator/demodulator is used, and a method to process digital transmit data in such a modulator/demodulator.

BACKGROUND OF THE INVENTION

Such a transmitter, modulator/demodulator, communication system and method are already known in the art, e.g. from the contribution to the *ADSL Standard T1E1.4 with reference number T1E1.4/93-025*, written by John M. Cioffi and Po T. Tong, and entitled 'VLSI DMT Implementation for ADSL'. Therein, an implementation of a discrete multi tone (DMT) modulator/demodulator dedicated to be used in an Asymmetric Digital Subscriber Line (ADSL) environment is described. The DMT modem comprises a transmitting part and a receiving part, combined in what is called a central office ADSL transceiver on page 1, and a remote terminal ADSL transceiver on page 2. As is seen from FIG. 1 and FIG. 2 of the contribution, these transceivers include a digital signal processor. This digital signal processor (see page 5, paragraph 2.2 and FIG. 4, or see page 12 paragraph 3.2 and FIG. 7) comprises modulation means, named a complex-to-real IFFT (Inverse Fast Fourier Transformer), and demodulation means, named a real-to-complex FFT (Fast Fourier Transformer). As is seen e.g. from FIG. 4, the modulation means IFFT are coupled to a digital to analogue converter DAC, whilst the demodulation means FFT are preceded by an analogue to digital converter, not shown in FIG. 4 but for evident reasons present. The analogue to digital converter in the receiving part and the digital to analogue converter in the transmitting part may operate under control of one clock or different clocks which are synchronised. To cancel within received data symbols, called DMT symbols in the cited document, echoes of transmit data symbols, the transceiver in FIG. 4 further is provided with an echo canceller. If transmit data symbols and received data symbols are not aligned when entering the echo canceller, echo cancellation becomes rather complex since echoes of more than one transmit data symbol should then be cancelled within a received data symbol.

This problem is known e.g. from another contribution to the ADSL Standard, entitled 'Modification to DMT Synchronization Pattern Insertion'. This contribution with reference number T1E1.4/93-089 is written by John M. Cioffi and James T. Aslanis. In paragraph 3 thereof, it is recommended to adjust the symbol boundaries of transmitted DMT symbols to coincide with the symbol boundaries of incoming DMT symbols. One of the arguments supporting this recommendation is that it can substantially reduce the complexity of echo cancellers (see page 4, lines 2 and 3).

Misalignment of transmit data symbols and received data symbols occurs when two communicating modems are equipped with independent fixed clocks which control their analogue to digital and digital to analogue converters. Because of the difference between the clock periods of two fixed clocks, the boundaries of transmit data symbols and those of received data symbols will be in relative motion. The problem however not only arises when two communicating modems are equipped with fixed clocks but also exists if these modems make use of controllable clocks, e.g. voltage controlled crystal oscillators, whose clock periods can only be coarse tuned.

SUMMARY OF THE INVENTION

An object of the present invention is to provide a transmitter, a modulator/demodulator, a communication system and a method of the above known type, but wherein transmit data symbols and received data symbols are aligned, and consequently wherein the complexity of echo cancellation is reduced.

According to the invention, this object is achieved by a transmitter to an input of which digital transmit data are applied to generate therefrom an analog transmit signal, the transmitter including modulation means adapted to modulate the digital transmit data on at least one transmit data carrier to thereby constitute transmit data symbols; a digital to analog converter adapted to convert, under the control of a clock signal, the transmit data symbols into the analog transmit signal; and a clock adapted to generate the clock signal, characterised in that the transmitter further is equipped with transmit rotation means adapted to rotate the phase of the at least one transmit data carrier in proportion to its respective carrier frequency; and transmit skip/stuff means, coupled between the modulation means and the digital to analog converter and adapted to duplicate and to delete samples in the transmit data symbols.

This object is also achieved by a modulator/demodulator comprising a transmitting part to an input of which digital transmit data are applied to generate therefrom an analog transmit signal; a receiving part to an input of which an analog received signal is applied to be transformed into digital received data; and at least one clock adapted to generate at least one clock signal, the transmitting part including modulation means adapted to modulate the digital transmit data on at least one transmit data carrier to thereby constitute transmit data symbols; and a digital to analog converter adapted to convert, under the control of a clock signal of the at least one clock signal, the transmit data symbols into the analog transmit signal, and the receiving part including an analog to digital converter adapted to convert, under the control of a clock signal of the at least one clock signal, the analog received signal into received data symbols modulated on at least one received data carrier; and demodulation means, coupled to the analog to digital converter and adapted to demodulate the received data symbols to thereby generate the digital received data, characterised in that the transmitting part further is equipped with transmit rotation means adapted to rotate the phase of the at least one transmit data carrier in proportion to its respective carrier frequency; and transmit skip/stuff means, coupled between the modulation means and the digital to analog converter and adapted to duplicate and to delete samples in the transmit data symbols.

This object is still further achieved by a communication system comprising a first modulator/demodulator, a second modulator/demodulator and a transmission line coupling the first modulator/demodulator to the second modulator/demodulator, the first and second modulator/demodulator each comprising a transmitting part to an input of which digital transmit data are applied to generate therefrom an analog transmit signal to be applied to the transmission line;

a receiving part to an input of which, coupled to the transmission line, an analog received signal is to be transformed into digital received data; and at least one clock adapted to generate at least one clock signal, the transmitting part including modulation means adapted to modulate the digital transmit data on at least one transmit data carrier to thereby constitute transmit data symbols; and a digital to analog converter adapted to convert, under the control of a clock signal of the at least one clock signal, the transmit data symbols into the analog transmit signal, and the receiving part including an analog to digital converter adapted to convert, under the control of a clock signal of the at least one clock signal, the analog received signal into received data symbols modulated on at least one received data carrier; and demodulation means, coupled to the analog to digital converter and adapted to demodulate the received data symbols to thereby generate the digital received data, characterised in that the transmitting part of at least one of the first and the second modulator/demodulators further is equipped with transmit rotation means adapted to rotate the phase of the at least one transmit data carrier in proportion to its respective carrier frequency; and transmit skip/stuff means, coupled between the modulation means and the digital to analog converter and adapted to duplicate and to delete samples in the transmit data symbols.

This object is also achieved by a method to process digital transmit data for being transmitted over a transmission line, the method comprising the steps of receiving a received pilot carrier forming part of an analog received signal; measuring a phase difference between the received pilot carrier and an expected received pilot carrier; phase rotating transmit data carriers in proportion to their respective frequencies and in proportion to the phase difference; modulating the digital transmit data on the transmit data carriers thereby constituting transmit data symbols; duplicating or deleting samples in the transmit data symbols; converting the transmit data symbols into an analog transmit signal; and applying the analog transmit signal to the transmission line.

In this way, by rotating the phase of the carriers whereon digital transmit data is modulated in proportion to their respective carrier frequencies, and by duplicating or deleting samples in the transmit data symbols, these symbols are shifted forward or backward in time. Thus, boundaries of receive data symbols and transmit data symbols can be aligned. The phase rotation applied to the transmit data symbols will increase or decrease gradually for successive transmit data symbols since the misalignment between transmit data symbols and received data symbols changes gradually due to a clock speed difference between the clocks of two communicating modems. In a two dimensional vector plane, the vectors representing the carriers of transmit data symbols are rotating when the vectors representing the carriers of received data symbols are fixed, and vice versa. This rotation is compensated for by the transmit rotation means. When the rotation to be applied by the transmit rotation means corresponds to a time shift of half a sample period at the transmitter, the skip/stuff means is activated to duplicate or to delete one sample in a transmit data symbol so that the rotation to be applied by the transmit rotation means again decreases by an equivalent amount.

It is to be noticed that the present invention is not only dedicated to be used in echo cancelling environments but also is very suitable for systems wherein upstream and downstream transmission takes place in separate time intervals. In such time division duplexing (TDD) systems, alignment of upstream and downstream travelling symbols is recommended, as will be recognised by a person skilled in the art. Furthermore, also in multipoint-to-point systems wherein a central station broadcasts downstream information to a plurality of terminals which share the upstream capacity towards the central station via time division multiplexing (TDM), synchronisation of the upstream and downstream travelling packets may be recommended.

In addition, a feature of the transmitter according to the present invention is that it further may be equipped with activation means adapted to activate and to de-activate the transmit rotation means and the transmit skip/stuff means.

Indeed, to align received and transmitted data symbols, it is sufficient that one of the transmitters of two communication modems is activated. The facility to activate and de-activate the rotation means and skip/stuff means is therefore provided. Obviously, if one agrees in a particular system for instance that only remote terminal modems and not the central office transmitters have to be equipped with rotation and skip/stuff means, their is no need to de-activate these means. In such systems, the activation means are not required.

An additional characteristic feature of the present invention is that the modulator/demodulator may also include receive rotation means and receive skip/stuff means, wherein the receive rotation means is adapted to rotate the phase of the at least one received carrier in rotation to its respective carrier frequency; and wherein the receive skip/stuff means is adapted to duplicate and to delete samples in the received data symbols.

Hence, the clock speed differences between clocks of two communicating modems are also compensated for in received data symbols in a similar way as in the above cited contribution with reference number T1E1.4/93-025. Since however the known receive rotation means and receive skip/stuff means have no influence on the alignment of transmit and received symbols on the line, they cannot be used to synchronise transmit and received data symbols.

A characteristic feature of the present modulator/demodulator is that it also may be equipped with activation means adapted to activate and to de-activate the transmit rotation means, the transmit skip/stuff means, the receive rotation means and the receive skip/stuff means.

Indeed, as already mentioned above, when two communicating modems are both equipped with rotating means and skip/stuff means in their respective transmitting and receiving parts, these means should be activated in one of the modems and be de-activated in the second one.

Yet another feature of the modulator/demodulator according to the present invention, is that it further includes communication means and decision means wherein the communication means is adapted to communicate via a transmission line with a second but similar modulator/demodulator; and wherein the decision means is connected between the communication means and the activation means and is adapted to decide, based on information received from the second modulator/demodulator via the communication means whether the activation means has to activate or de-activate the means coupled thereto.

In this way, a communication between two connected modems can be set up at initialisation of the system to decide in which modem the rotating means and the skip/stuff means will be activated. Different decision criteria can be used by the decision means. A first possible strategy might be based on the rule that the central office modem always acts as the master of the remote terminal modem. Thus, the remote terminal will have to activate its rotating and skip/stuff means to adapt its received data symbols and transmit data symbols in accordance to the central office clock. A second strategy might be that the central office modem slaves to the remote terminal modem and therefore activates its rotation means and skip/stuff means.

Furthermore, a characteristic feature of the present modulator/demodulator is that it is equipped with phase difference measurement means adapted to measure a phase difference between a received pilot carrier and an expected received pilot carrier, and to generate, based on the phase difference, signals to control the transmit rotation means and the transmit skip/stuff means.

The measured phase difference between the received pilot tone and expected received pilot tone serves as a measure for the phase rotation that has to be applied to the transmit data carriers. In fact, this phase difference variation is a measure for the clock speed difference between the clocks of the two communicating modems. It is however evident that any other estimate of the clock speed difference and means executing this estimate may replace the phase difference measurement means.

Still a feature of the present modulator/demodulator is that the phase difference measurement means also controls the receive rotation means and skip/stuff means.

In this way, the phase rotation applied to the received data symbols can also be made proportional to the measured phase difference.

BRIEF DESCRIPTION OF THE DRAWING

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
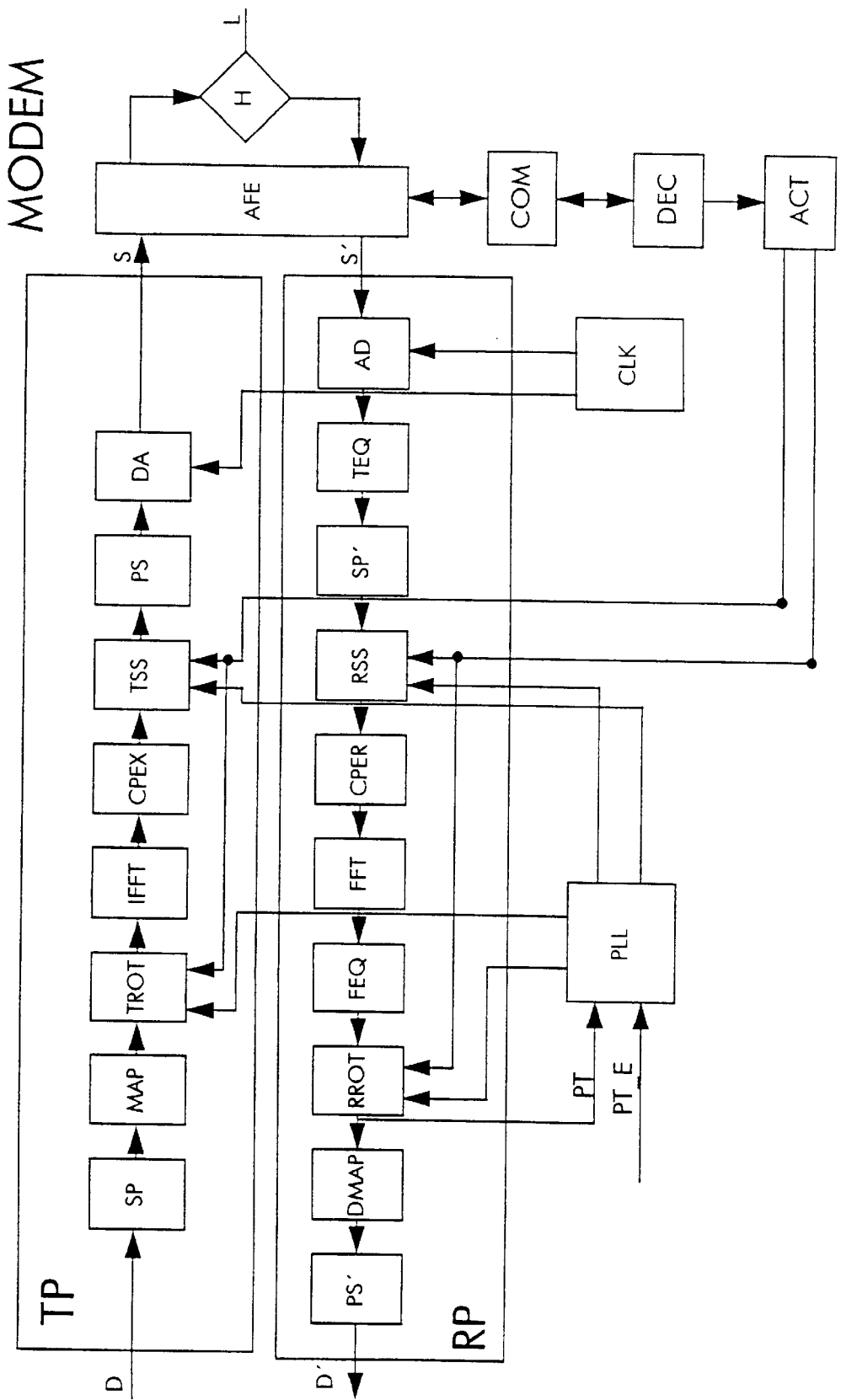
FIG. 1 represents a functional block scheme of an embodiment of the modulator/demodulator MODEM according to the present invention.

The modulator/demodulator MODEM in FIG. 1 includes a transmitting part TP and a receiving part RP. The transmitting part TP comprises a serial to parallel converter SP, a mapper MAP, a transmit rotation circuit (sometimes referred to herein as means) TROT, an inverse fast fourier transformer IFFT, a cyclic prefix extender CPEX, a transmit skip/stuff means TSS, a parallel to serial converter PS and a digital to analogue converter DA. The receiving part RP comprises an analogue to digital converter AD, a time domain equaliser TEQ, a serial to parallel converter SP', a receive skip/stuff means RSS, a cyclic prefix eraser CPER, a fast fourier transformer FFT, a frequency domain equaliser FEQ, a receive rotation circuit (sometimes referred to herein as means) RROT, a demapper DMAP, and a parallel to serial converter PS'. It is noticed that the order of the receive rotation means RROT and frequency domain equaliser FEQ might be reversed, and the time domain equaliser TEQ might be missing. The modulator/demodulator MODEM further is provided with an analogue front end AFE, a hybrid means H, a communication means COM, a decision means DEC, an activation means ACT, a phase locked loop PLL and a clock CLK.

In the transmitting part TP, the serial to parallel converter SP, the mapper MAP, the transmit rotation means TROT, the inverse fast fourier transformer IFFT, the cyclic prefix extender CPEX, the transmit skip/stuff means TSS, the parallel to serial converter PS and the digital to analogue converter DA are cascade connected between a digital data input D and an analogue signal output S. The analogue signal output S is coupled to a transmission line L via the analogue front end AFE and hybrid means H. Via this hybrid means H and the analogue front end AFE, the transmission line L is also coupled to an analogue signal input S' of the receiving part RP. Inside the receiving part RP, the analogue to digital converter AD, the time domain equaliser TEQ, the serial to parallel converter SP', the receive skip/stuff means RSS, the cyclic prefix eraser CPER, the fast fourier transformer FFT, the frequency domain equaliser FEQ, the receive rotation means RROT, the demapper DMAP and the parallel to serial converter PS' are series connected between the analogue signal input S' and a digital data output D'. An output of the receive rotation means RROT is also coupled to a pilot tone input PT of the phase locked loop PLL, a second input of which, called an expected pilot tone input PT_E, is coupled to an expected pilot tone generator not shown in FIG. 1. Output links of the phase locked loop PLL are connected to control inputs of the transmit rotation means TROT, the transmit skip/stuff means TSS, the receive rotation means RROT and the receive skip/stuff means RSS respectively. Via a bi-directional link, the communication means COM is coupled to the analogue front end AFE. In FIG. 1, this bi-directional link is represented by a single line directly interconnecting the communication means COM and the analogue front end AFE. A person skilled in the art will recognise that in a more realistic implementation of the modem MODEM, an output of the communication means COM serves as an additional input for the transmitting part TP and an input of the communication means COM is connected to an additional output of the receiving part RP. In other words, the communication means COM is not directly connected to the analogue front end AFE but communicates with this analogue front end AFE via the receiving part RP and transmitting part TP of the modem MODEM. In addition, a terminal of the communication means COM and a terminal of the decision means DEC are bi-directionally interconnected, and an output of the decision means DEC is coupled to an input of the activation means ACT. The activation means ACT has a plurality of outgoing connections, to the transmit rotation means TROT and transmit skip/stuff means TSS, to the receive rotation means RROT and receive skip/stuff means RSS respectively. An output of the clock CLK is connected to clock inputs of both the digital to analogue converter DA and analogue to digital converter AD. The clock CLK in FIG. 1 is supposed to be a fixed clock or a voltage controlled oscillator for coarse tuning of the clock period.

Figure 2:
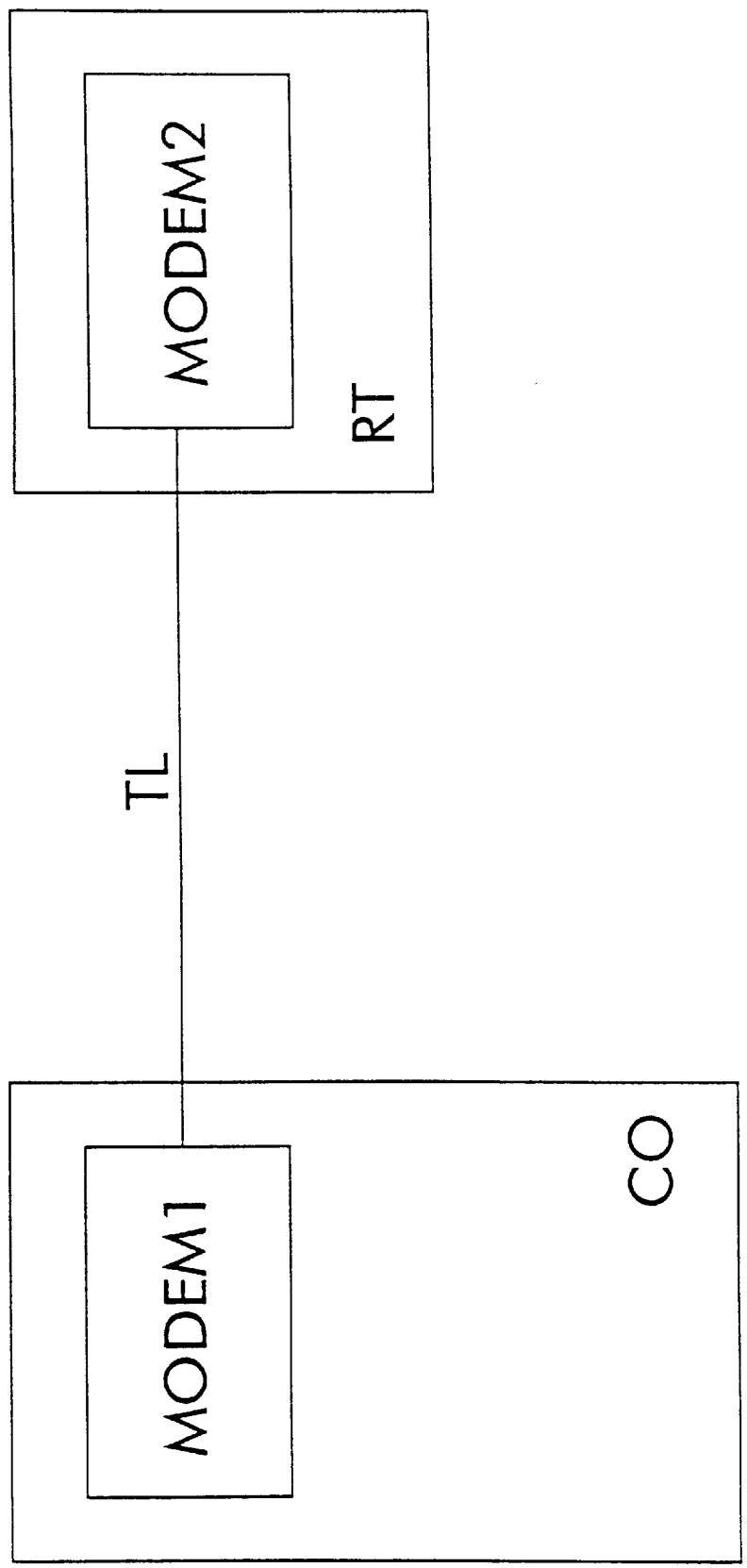
FIG. 2 represents a block scheme of an embodiment of a communication system including two modulator/demodulators, MODEM1 and MODEM2, according to the present invention.

As is seen from FIG. 2, the communication system drawn therein includes a first modulator/demodulator MODEM1 which forms part of a central office CO, and a second modulator/demodulator MODEM2 which forms part of a remote terminal RT. Both modems, MODEM1 and MODEM2, are coupled via a transmission line TL.

In the following paragraphs, the working of the communication system drawn in FIG. 2 will be described in detail. Thereto, it will be supposed that both modems, MODEM1 and MODEM2, are of the type of the modulator/demodulator MODEM shown in FIG. 1. First, the working of the different functional blocks will be described, supposing that the transmit rotation means TROT, the transmit skip/stuff means TSS, the receive rotation means RROT and the receive skip/stuff means RSS are de-activated in the modem MODEM2 of the remote terminal RT as well as in the modem MODEM1 of the central office CO. From the description of the working, it will be clear to a person skilled in the art how to implement the different functional blocks drawn in FIG. 1. In a second phase, the transmit rotation means TROT, transmit skip/stuff means TSS, receive rotation means RROT and receive skip/stuff means RSS in the modem MODEM2 of the remote terminal RT will be activated and the functionality of these blocks will be described.

The transmission line TL in FIG. 2 represents a twisted pair telephone line. One development allowing to bring information via such a telephone line to the peoples home and supporting a dedicated back channel from the home to the central office is called Asymmetric Digital Subscriber Line (ADSL). Therein, Discrete Multi Tone (DMT) modulation is used to modulate digital information on a set of carriers with equidistant frequencies. Although this is no restriction to the applicability of the present invention, it is supposed that the central office CO and remote terminal RT of FIG. 2 are equipped with Discrete Multi Tone (DMT) modems, MODEM1 and MODEM2 respectively, similar to the modem MODEM drawn in FIG. 1. According to the *ANSI Standard on ADSL, entitled 'Asymmetric Digital Subscriber Line (ADSL) Metallic Interface Specification'*, published by the *American National Standards Institute, Inc. (ANSI)* in April 1994, the upstream and downstream channels may be separated by frequency division multiplexing (FDM) or by echo cancelling. It is to be remarked that the approved version of the above ANSI Standard on ADSL is referred to as ANSI T1.473 and is entitled '*Network and Customer Installation Interfaces, Asymmetric Digital Subscriber Line (ADSL) Metallic Interface*'. Alternatively, time division duplexing (TDD) could be used. When opting for the echo cancelling or time division duplexing (TDD) technique, some or all carriers may be used for modulation of data thereon in the upstream direction as well as in the downstream direction. The present invention is more useful in echo cancelling and TDD (Time Division Duplexing) environments although its application is not excluded in FDM (Frequency Division Multiplexing) systems. Although not shown in FIG. 1, the modulator/demodulator MODEM is supposed to be equipped with an echo canceller between its transmitting part TP and receiving part RP.

The next paragraphs are focused on the structure and functioning of the modem MODEM2 in the remote terminal RT. It is supposed that this modem MODEM2 is of the type of MODEM in FIG. 1 wherein the activation means ACT de-activates the transmit rotation means TROT, the transmit skip/stuff means TSS, the receive rotation means RROT, and the receive skip/stuff means RSS. In upstream direction, i.e. in the direction from the remote terminal RT to the central office CO, MODEM2 modulates digital data D on a set of carriers, each one being modulated by QAM (Quadrature Amplitude Modulation) modulation. Obviously, other modulation schemes could also be used. The digital data stream D which is a serial sequence of bits, thereto is parallelised by the serial to parallel converter SP. The mapper MAP then allocates to each one of the carriers a dedicated amount of bits to be modulated thereon. These different amounts are calculated taking into account parameters such as the signal to noise ratio and the line attenuation on each carrier. Obviously, a carrier which is less attenuated by the line is allowed to carry more bits than a high attenuated or disturbed carrier. As a result, three bits will for instance be modulated by 8 QAM modulation on the first carrier, 9 bits will for instance be modulated by 512 QAM modulation on the second carrier, and so on, thereby generating frequency domain DMT symbols. By the inverse fast fourier transformer, these DMT symbols are transformed from frequency domain to time domain. The cyclic prefix extender CPEX then extends each DMT symbol with a fixed length prefix to preventively protect transmit DMT symbols against intersymbol and intercarrier interference due to transmission over the telephone line TL. Successive DMT symbols are then serialised by the parallel to serial converter PS and converted into an analogue signal S by the digital to analogue converter DA.

In the opposite direction, i.e. the downstream direction from the central office CO towards the remote terminal RT, an analogue signal S' arriving at MODEM2 is demodulated by the receiving part RP thereof and converted into a digital output signal D'. The analogue signal S' is digitised in the analogue to digital converter AD. To compensate for intersymbol interference on the transmission line TL, the time domain equaliser filters the received samples with a digital filter that is constituted to shorten the length of the transmission line impulse response. Successive samples in the digitised stream that belong to the same DMT symbol are parallelised by the serial to parallel converter SP'. The cyclic prefix is erased from the DMT symbols in the cyclic prefix eraser CPER, and the fast fourier transform processor FFT transforms the time domain DMT symbols into frequency domain DMT symbols. The demapper DMAP is aware of the bit constellations of the different carriers and QAM demodulates the different carriers to obtain the exact number of bits therefrom. Via the parallel to serial converter PS', the demodulated bits are then serialised and applied to the digital data output D' of the receiving part RP.

The analogue front end AFE and hybrid means H convert and condition the signals, S and S', to and from the transmission line. Front-end filtering and transmission line coupling for instance are performed with the appropriate levels of linearity and noise. Plain analogue telephone signals transmitted in the lower frequency bands, are separated from the digital data by a splitter provided thereto.

The functional blocks constituting the DMT modem MODEM2 will not be described in further detail in this application since such details would be irrelevant with respect to the present invention. For more details about the implementation and working of the modem components, reference is made to the article '*A Multicarrier E1-HDSL Transceiver System with Coded Modulation*', written by Peter S. Chow, Noofal Al-Dhahir, John M. Cioffi and John A. C. Bingham, and published in the issue Nr. 3, May/June 1993 *of the Journal of European Transactions on Telecommunications and Related Technologies (ETT)*, pages 257–266, and to the article '*Performance Evaluation of a Multichannel Transceiver System for ADSL and VHDSL Services*' from Peter S. Chow et al., published in the issue Nr. 6, August 1991 *of the Journal of European Transactions on Telecommunications and Related Technologies (ETT)*, pages 909–919.

For the modem, MODEM1 in the central office CO, a similar structure can be described. The working thereof in up- and downstream direction is completely equivalent to that of the DMT modem MODEM2 in the remote terminal RT. Only the clock that is used in the central office CO to control the digital to analogue converter DA and analogue to digital converter AD is different from that used in the remote terminal RT. It is assumed that, in each one of the modems, MODEM1 and MODEM2, the same clock is used for the analogue to digital converter and the digital to analogue converter. Alternatively, in each modem, the analogue to digital converter clock could be derived from the digital to analogue converter clock or vice versa. As a result, upstream and downstream travelling DMT symbols are sampled differently. At transmission, upstream travelling DMT symbols are sampled under control of the remote terminal clock, whilst downstream travelling DMT symbols are sampled under control of the central office clock. When arriving at the remote terminal RT, downstream travelling DMT symbols are sampled under control of the remote terminal clock which is slower or faster than the central office clock. The same holds for the upstream travelling DMT symbols when sampled at the central office CO. Without further actions, the received DMT symbols are sampled too fast or too slow. This would cause a loss of DMT symbol alignment and a rotation of the received QAM modulated symbols. Therefore, in the following paragraph, it is supposed that the activation means ACT in the remote terminal RT activates the receive rotation means RROT and the receive skip/stuff means RSS.

The sample clock speed difference is compensated for by the receive rotation means RROT and the receive skip/stuff means RSS in the modem MODEM2 of the remote terminal when it is supposed that these means are activated. According again to the earlier cited ADSL Standard, one of the carriers of DMT symbols is reserved as pilot tone. This pilot tone is observed in the received DMT symbols at the output of the receive rotation means RROT and is applied to the pilot tone input PT of the phase locked loop PLL. The phase locked loop PLL then measures the phase difference between this pilot tone PT and a pilot tone that was expected to be received PT_E. The resulting phase difference variation is a measure for the clock speed difference between the clocks of the modem MODEM1 in the central office CO and the modem MODEM2 in the remote terminal RT. To compensate for this clock speed difference in the received DMT symbols, each carrier thereof has to be rotated over a phase that is proportional to the measured phase difference, and proportional to its own frequency. Indeed, to shift received DMT symbols over a time period which corresponds to the difference between the clock period of the central office clock and the clock period of the remote terminal clock, carrier 1 has to be phase rotated over a phase $\alpha$, carrier 2 having a double frequency of carrier 1, has to be phase rotated over a phase $2.\alpha$, and so on. The factor a depends on the measured phase difference between the pilot tone PT and expected pilot tone PT_E, and will increase gradually since this phase difference grows stepwise for each successively received DMT symbol. The magnitude of the step depends on the already mentioned difference in clock speeds. Thus, when activated by the activation means ACT, the receive rotation means RROT under control of the phase locked loop PLL is able to compensate for the clock speed differences between central office CO and remote terminal RT. Once the leading or lagging of the central office clock compared to the remote terminal clock reaches half the sample period, the receive skip/stuff means RSS is activated to duplicate or to delete one sample in the received DMT symbol, so that the phase rotation that has to be applied to the different carriers by RROT again reduces. It is to be remarked that the presence of a receive rotation means such as RROT and a receive skip/stuff means such as RSS to compensate for clock speed differences in received DMT symbols is already described in *the Contribution to the ADSL Standard* cited in the opening part of this application, more particularly in paragraph 2.2.7, 2.2.8 and FIG. 4 for the central office modem, and in paragraph 3.2.7, 3.2.8 and FIG. 7 for the remote terminal modem.

Besides compensation for clock speed differences in received DMT symbols, it is also recommended to align upstream and downstream travelling DMT symbols to reduce the complexity of echo cancelling To align the transmitted DMT symbols, with the received DMT symbols, the transmitted symbols have to be processed before applying them to the transmission line TL. Since this alignment implies a shift in time, forward or backward, and a rotation in phase which is proportional to the clock speed difference between remote terminal RT and central office CO and in proportion to the frequency of the respective carrier, the processing can again be performed by a rotation means and skip/stuff means. In FIG. 1, the transmit rotation means TROT and transmit skip/stuff means TSS are included thereto. When activated by the activation means ACT, the transmit rotation means TROT and transmit skip/stuff means TSS of the remote terminal RT will apply phase rotations to the different carriers whereon the transmit data D are modulated so that the transmit DMT symbols in S are virtually aligned with the received DMT symbols in S' at the transmission line TL. Samples of the transmitted DMT symbols are duplicated or deleted by the transmit skip/stuff means TSS whenever the time shift to be applied to transmit DMT symbols reaches half a sample period of the central office clock.

It should be remarked that synchronisation and coarse DMT symbol alignment is realised during system initialisation. Thereto, the central office modem MODEM1 sends for instance a pilot tone to the remote terminal modem MODEM2. This modem MODEM2 locks on this pilot by adjusting its receive clock. Next it adjusts its transmit clock in accordance to the measured clock difference between MODEM1 and MODEM2. Further, each modem measures the transmission line and calculates an optimal DMT symbol alignment. Thereto, each modem can transmit known data sequences. Each modem then adjusts its symbol alignment in accordance to the measured value.

As supposed above, both modems, MODEM1 in the central office CO and the modem MODEM2 in the remote terminal RT, are equipped with a transmit rotation means TROT, transmit skip/stuff means TSS, receive rotation means RROT, and receive skip/stuff means RSS. Obviously, to compensate for clock speed differences and to align upstream and downstream travelling DMT symbols, these means, RROT, TROT, RSS and TSS, have to be activated in only one of the two modems, MODEM1 and MODEM2. For this reason, the modems MODEM1 and MODEM2 include communication means COM which allow the two modems, MODEM1 and MODEM2, to communicate at initialisation of the system. Upon this initial communication, the decision means DEC in both modems, MODEM1 and MODEM2, are capable to decide which modem should activate its rotation and skip/stuff means, RROT, TROT, RSS and TSS, and which modem should de-activate these means, RROT, TROT, RSS and TSS. This decision might be based on several criteria, as already indicated in the above introductory part. It should be clear that the present invention is not restricted to any particular decision criterion used by the decision means DEC.

It has to be remarked that, although the above described embodiment of a modulator/demodulator, according to the present invention, is used in an ADSL environment, the present invention is not restricted thereto. It is clear to a person skilled in the art that minor modifications of the described embodiment allow it to be implemented in any application wherein bidirectional travelling cells or symbols for whatever reasons have to be aligned. If these symbols are constituted by digital data modulated on at least one carrier, the present invention is applicable.

A further remark is that, although the data symbols in the above described embodiment are transported over a telephone line TL, the applicability of the present invention is not restricted by the transmission medium via which the data are transported. In particular, on any connection between two communicating modems, MODEM1 and MODEM2, e.g. a cable connection, an optical connection, a satellite connection, a radio link through the air, and so on, alignment of upstream and downstream travelling packets may be recommended, and this may be realised by the present invention.

Furthermore, it is noticed that a person skilled in the art will be able to adapt the above described embodiment for example so that it is applicable also to systems wherein DWMT (Discrete Wavelet Multi Tone) modulation instead of DMT (Discrete Multi Tone) modulation is used. Therein, the above mentioned fourier transformer and inverse fourier transformer are replaced by filterbanks and wavelet transformers.

Yet a further remark is that the modulation type is also irrelevant with respect to applicability of the present invention. In the above described embodiment, data are modulated on and demodulated from the set of carriers via QAM (Quadrature Amplitude Modulation) modulation and demodulation respectively. Alternatively, other modulation techniques such as phase modulation may be used.

Another remark is that the upstream and downstream data symbols may be aligned entirely by the transmit rotation and skip/stuff means at the remote terminal RT or at the central office CO. The alignment may also be realised partially at each side, for instance 50% at the central office side CO and 50% at the remote terminal side RT.

While the principles of the invention have been described above in connection with specific apparatus, it is to be clearly understood that this description is made only by way of example and not as a limitation on the scope of the invention.

The invention claimed is:

1. A transmitter system to an input of which digital transmit data (D) are applied to generate therefrom an analog transmit signal (S), said transmitter system including a transmitter part (TP) including:
   a1. modulation means (MAP, IFFT) adapted to modulate said digital transmit data (D) on at least one transmit data carrier to thereby constitute transmit data symbols;
   a2. a digital to analog converter (DA) adapted to convert, under the control of a clock signal, said transmit data symbols into said analog transmit signal (S); and the transmitter system further including:
   a3. a clock (CLK) adapted to generate said clock signal, characterised in that said transmitter part (TP) further is equipped with:
   a4. transmit rotation means (TROT) adapted to rotate the phase of said at least one transmit data carrier in proportion to its respective carrier frequency; and
   a5. transmit skip/stuff means (TSS), coupled between said modulation means (MAP, IFFT) and said digital to analog converter (DA) and adapted to duplicate and to delete samples in said transmit data symbols.

2. A transmitter system according to claim 1, characterised in that said transmitter system further includes:
   a.6. activation means (ACT) adapted to activate and to de-activate said transmit rotation means (TROT) and said transmit skip/stuff means (TSS).

3. A modulator/demodulator (MODEM) comprising:
   a. a transmitting part (TP) to an input of which digital transmit data (D) are applied to generate therefrom an analog transmit signal (S);
   b. a receiving part (RP) to an input of which an analog received signal (S') is applied to be transformed into digital received data (D'); and
   c. at least one clock (CLK) adapted to generate at least one clock signal, said transmitting part (TP) including:
      a1. modulation means (MAP, IFFT) adapted to modulate said digital transmit data (D) on at least one transmit data carrier to thereby constitute transmit data symbols; and
      a2. a digital to analog converter (DA) adapted to convert, under the control of a clock signal of said at least one clock signal, said transmit data symbols into said analog transmit signal (S),
   and said receiving part (RP) including:
      b1. an analog to digital converter (AD) adapted to convert, under the control of a clock signal of said at least one clock signal, said analog received signal (S') into received data symbols modulated on at least one received data carrier; and
      b2. demodulation means (FFT, DMAP), coupled to said analog to digital converter (AD) and adapted to demodulate said received data symbols to thereby generate said digital received data (D'),
   characterised in that said transmitting part (TP) further is equipped with:
      a3. transmit rotation means (TROT) adapted to rotate the phase of said at least one transmit data carrier in proportion to its respective carrier frequency; and
      a4. transmit skip/stuff means (TSS), coupled between said modulation means (MAP, IFFT) and said digital to analog converter (DA) and adapted to duplicate and to delete samples in said transmit data symbols.

4. A modulator/demodulator (MODEM) according to claim 3, characterised in that said receiving part (RP) further is equipped with:
   b3. receive rotation means (RROT) adapted to rotate the phase of said at least one received carrier in proportion to its respective carrier frequency; and
   b4. receive skip/stuff means (RSS), adapted to duplicate and to delete samples in said received data symbols.

5. A modulator/demodulator (MODEM) according to claim 4 characterised in that said modulator/demodulator (MODEM) further includes:
   d. activation means (ACT) adapted to activate and to de-activate said transmit rotation means (TROT), said transmit skip/stuff means (TSS), said receive rotation means (RROT) and said receive skip/stuff means (RSS).

6. A modulator/demodulator (MODEM) according to claim 5, characterised in that said modulator/demodulator (MODEM) further is provided with:
   e. communication means (COM), adapted to communicate via a transmission line (L) with a second but similar modulator/demodulator; and
   f. decision means (DEC) connected between said communication means (COM) and said activation means (ACT) and adapted to decide, based on information received from said second modulator/demodulator via said communication means (COM) whether said activation means (ACT) has to activate or de-activate said means (TROT, TSS, RROT, RSS) coupled thereto.

7. A modulator/demodulator (MODEM) according to claim 3, characterised in that said modulator/demodulator (MODEM) further includes:
  d. a phase difference measurement means (PLL) adapted to measure a phase difference between a received pilot carrier (PT) and an expected received pilot carrier (PT_E), and to generate, based on said phase difference, signals to control said transmit rotation means (TROT) and said transmit skip/stuff means (TSS).

8. A modulator/demodulator (MODEM) according to claim 7, characterised in that said receiving part (RP) further is equipped with receive rotation means (RROT) adapted to rotate the phase of said at least one received carrier in proportion to its respective carrier frequency, and receive skip/stuff means (RSS), adapted to duplicate and to delete samples in said received data symbols; and further characterised in that said phase difference measurement means (PLL) is further adapted to generate, based on said phase difference, signals to control said receive rotation means (RROT) and said receive skip/stuff means (RSS).

9. A communication system comprising a first modulator/demodulator (MODEM1), a second modulator/demodulator (MODEM2) and a transmission line (TL) coupling said first modulator/demodulator (MODEM1) to said second modulator/demodulator (MODEM2), said first modulator/demodulator (MODEM1) and said second modulator/demodulator (MODEM2) each comprising:
  a. a transmitting part (TP) to an input of which digital transmit data (D) are applied to generate therefrom an analog transmit signal (S) to be applied to said transmission line (TL);
  b. a receiving part (RP) to an input of which, coupled to said transmission line (TL), an analog received signal (S') is to be transformed into digital received data (D'); and
  c. at least one clock (CLK) adapted to generate at least one clock signal, said transmitting part (TP) including:
    a1. modulation means (MAP, IFFT) adapted to modulate said digital transmit data (D) on at least one transmit data carrier to thereby constitute transmit data symbols; and
    a2. a digital to analog converter (DA) adapted to convert, under the control of a clock signal of said at least one clock signal, said transmit data symbols into said analog transmit signal (S),
  and said receiving part (RP) including:
    b1. an analog to digital converter (AD) adapted to convert, under the control of a clock signal of said at least one clock signal, said analog received signal (S') into received data symbols modulated on at least one received data carrier; and
    b2. demodulation means (FFT, DMAP), coupled to said analog to digital converter (AD) and adapted to demodulate said received data symbols to thereby generate said digital received data (D'),
  characterised in that said transmitting part (TP) of at least one of said first modulator/demodulator (MODEM1) and said second modulator/demodulator (MODEM2) further is equipped with:
    a3. transmit rotation means (TROT) adapted to rotate the phase of said at least one transmit data carrier in proportion to its respective carrier frequency; and
    a4. transmit skip/stuff means (TSS), coupled between said modulation means (MAP,IFFT) and said digital to analog converter (DA) and adapted to duplicate and to delete samples in said transmit data symbols.

10. A method to process digital transmit data (D) for being transmitted over a transmission line (L), said method comprising the steps of:
  a. receiving a received pilot carrier (PT) forming part of an analog received signal (S');
  b. measuring a phase difference between said received pilot carrier (PT) and an expected received pilot carrier (PT_E);
  c. phase rotating data carriers that are intended to carry said digital transmit data (D) in proportion to the respective frequencies of the data carriers and in proportion to said phase difference;
  d. modulating said digital data (D) on said transmit data carriers thereby constituting transmit data symbols;
  e. duplicating or deleting samples in said transmit data symbols;
  f. converting said transmit data symbols into an analog transmit signal (S); and
  g. applying said analog transmit signal (S) to said transmission line (L).

* * * * *